(12) United States Patent
Chen

(10) Patent No.: US 9,383,617 B2
(45) Date of Patent: Jul. 5, 2016

(54) SUB-PIXEL STRUCTURE OF THIN FILM TRANSISTOR LIQUID CRYSTAL DISPLAY AND LIQUID CRYSTAL DISPLAY

(71) Applicant: BEIJING BOE OPTOELECTRONICS TECHNOLOGY CO., LTD., Beijing (CN)

(72) Inventor: Xi Chen, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 173 days.

(21) Appl. No.: 13/704,305

(22) PCT Filed: Oct. 10, 2012

(86) PCT No.: PCT/CN2012/082695
§ 371 (c)(1),
(2) Date: Dec. 14, 2012

(87) PCT Pub. No.: WO2013/078921
PCT Pub. Date: Jun. 6, 2013

(65) Prior Publication Data
US 2013/0188109 A1    Jul. 25, 2013

(30) Foreign Application Priority Data
Nov. 29, 2011   (CN) .................. 2011 2 0484146 U

(51) Int. Cl.
*G02F 1/136*   (2006.01)
*G02F 1/1337*  (2006.01)
(Continued)

(52) U.S. Cl.
CPC .... *G02F 1/136286* (2013.01); *G02F 1/134309* (2013.01); *G02F 2001/134318* (2013.01); *G02F 2001/134345* (2013.01); *G02F 2001/134381* (2013.01)

(58) Field of Classification Search
CPC ............... G02F 1/136286; G02F 1/134309; G02F 1/134372; G02F 2001/134372; G02F 2001/134318; G02F 2001/134345; G02F 2001/134381
USPC ...................... 349/43, 129, 139, 143–144, 46
See application file for complete search history.

(56) References Cited

U.S. PATENT DOCUMENTS

| | | | |
|---|---|---|---|
| 2002/0097364 A1* | 7/2002 | Kwon et al. ......... | G02F 1/1368 349/139 |
| 2007/0002193 A1* | 1/2007 | Kim et al. ....................... | 349/38 |

(Continued)

FOREIGN PATENT DOCUMENTS

| | | |
|---|---|---|
| CN | 1696769 A | 11/2005 |
| CN | 201845776 A | 5/2011 |

(Continued)

OTHER PUBLICATIONS

International Preliminary Report on Patentability dated Jun. 3, 2014; PCT/CN2012/082695.

(Continued)

*Primary Examiner* — Nathanael R Briggs
(74) *Attorney, Agent, or Firm* — Ladas & Parry LLP

(57) ABSTRACT

According to embodiments of the present invention, there are provided a sub-pixel structure of a thin film transistor liquid crystal display and a liquid crystal display. The sub-pixel structure comprises: a gate line, a data line, a thin film transistor, a sub-pixel electrode, and a common electrode, which are formed on an array substrate, wherein a liquid crystal electric field in a first domain and a liquid crystal electric field in a second domain, which are located on both sides of the gate line, respectively, are created between the sub-pixel electrode and the common electrode, and the angle between the direction of the liquid crystal electric field in the first domain and the direction of the liquid crystal electric field in the second domain is larger than 0° and smaller than 180°.

6 Claims, 6 Drawing Sheets

(51) Int. Cl.
*G02F 1/1343* (2006.01)
*G02F 1/1362* (2006.01)

(56) References Cited

U.S. PATENT DOCUMENTS

| | | |
|---|---|---|
| 2008/0036932 A1* | 2/2008 | Lee .................................. 349/38 |
| 2009/0096978 A1* | 4/2009 | Kim ............................. 349/144 |
| 2009/0190083 A1 | 7/2009 | Lee et al. |
| 2010/0073613 A1* | 3/2010 | Yamada et al. ............... 349/110 |
| 2011/0216249 A1 | 9/2011 | Tsubata |
| 2011/0261307 A1 | 10/2011 | Shin et al. |

FOREIGN PATENT DOCUMENTS

| | | | |
|---|---|---|---|
| CN | 201845776 U | * | 5/2011 |
| CN | 102203663 A | | 9/2011 |
| CN | 102236211 A | | 11/2011 |
| CN | 202339463 U | | 7/2012 |

OTHER PUBLICATIONS

International Search Report mailed Jan. 24, 2013; PCT/CN2012/082695.

* cited by examiner

SUB-PIXEL STRUCTURE OF THIN FILM TRANSISTOR LIQUID CRYSTAL DISPLAY AND LIQUID CRYSTAL DISPLAY

TECHNICAL FIELD

Embodiments of the present invention relate to a sub-pixel structure of a thin film transistor liquid crystal display and a liquid crystal display.

BACKGROUND

Thin Film Transistor-Liquid Crystal Display (TFT-LCD) plays a leading role in the current market for flat panel displays due to its advantages of small size, light weight, low power consumption, irradiation-free, etc. A display panel of the TFT-LCD is formed in such a way that an array substrate and a counter substrate (e.g. a color filter substrate) are bonded together, and a gap between them is vacuumized and then a liquid crystal material is injected into it and sealed. On the display panel of the TFT-LCD, a pixel structure array constituted by hundreds of thousands to a million of pixel structures is formed, and these pixel structures act to display images under the control of TFTs.

At present, ADS has been widely used due to its advantage of wide viewing angle. ADS is the abbreviated form of ADSDS (ADvanced Super Dimension Switch), i.e. an Advanced Super Dimension Switch technology, in which a multi-dimensional electric field is formed by an electric field created at edges of strip-like electrodes in the same plane and an electric field created between a layer with strip-like electrodes and a plate-like electrode layer, so as to allow all the liquid crystal molecules with different orientations in a liquid crystal cell, which are located directly above the electrode and between the strip-like electrodes, to be rotated, thereby enhancing the work efficiency of liquid crystals and increasing the transmission efficiency. The Advanced Super Dimensional Switch technology is capable of improving the image quality of TFT-LCD products, and has advantages of high resolution, high transmittance, low power consumption, wide viewing angle, high aperture ratio, low chromatic aberration, push Mura-free, etc.

Generally, a pixel structure of an ADS mode TFT-LCD contains a plurality of sub-pixel structures. The configuration of an existing sub-pixel structure on an array substrate is shown in FIG. 1 and it comprises: a gate line 10 and a data line 20 perpendicular to each other, a thin film transistor 30 located in an intersection region of the gate line 10 and the data line 20, a sub-pixel electrode 40 (i.e. the plate-like electrode), and common electrodes 50 (i.e. a plurality of strip-like electrodes) formed in a region surrounded by the gate line 10 and the data line 20. The thin film transistor 30 is located above the gate line, wherein the gate electrode of the thin film transistor 30 is connected to the gate line 10, the drain electrode of the thin film transistor 30 is connected to the data line 20, and the source electrode of the thin film transistor 30 is connected to the sub-pixel electrode 40. The sub-pixel electrode 40 and the common electrodes 50 overlap with each other. Liquid crystal electric fields created between the common electrodes 50 and the sub-pixel electrode 40 is a multi-dimensional electric field and has a uniform direction. All the common electrodes 50 in this sub-pixel structure have a uniform direction, namely, a one-domain structure. In this structure, due to the uniform direction of multi-dimensional liquid crystal electric fields created between the common electrodes 50 and the sub-pixel electrode 40, liquid crystal molecules in one sub-pixel structure are tilted in a uniform deflection direction, thus resulting in a color deviation.

In order to solve the above problem of color deviation, a double-domain structure is used for sub-pixel structures of ADS mode TFT-LCDs currently. The configuration of a double-domain sub-pixel structure, on an array substrate, of an existing ADS mode TFT-LCD is shown in FIG. 2. As shown in FIG. 2, a sub-pixel structure of the ADS mode TFT-LCD comprises a gate line 10, a data line 20, a thin film transistor 30, a sub-pixel electrode 40 and common electrodes 50 on the array substrate. Different from the common electrodes 50 in the one-domain sub-pixel structure, the common electrodes 60 of the double-domain sub-pixel structure contain two kinds of strip-like common electrodes 61 and 62 which have different orientations. The direction of a liquid crystal electric field in a first domain created between the strip-like common electrodes 61 and the sub-pixel electrode 40 is different from the direction of a liquid crystal electric field in a second domain created between the strip-like electrodes 62 and the sub-pixel electrode 40. Because the liquid crystal electric fields created between the common electrodes 60 and the sub-pixel electrode 40 are classified into two domains, liquid crystal molecules can be tilted in two different directions. Thus, the problem of color deviation can be improved effectively.

However, since the liquid crystals at the interface of the two domains are non-uniformly tilted, a dark region is generated in a display area of the display panel.

As can be seen, in the existing ADS mode TFT-LCD which has the two-domain sub-pixel structure, the dark region is likely to occur, and the image quality of the liquid crystal display is not very satisfactory.

SUMMARY

According to an embodiment of the present invention, there is provided a sub-pixel structure of a thin film transistor liquid crystal display, comprising a gate line, a data line, a thin film transistor, a sub-pixel electrode, and a common electrode, which are formed on an array substrate, wherein a liquid crystal electric field in a first domain and a liquid crystal electric field in a second domain, which are located on both sides of the gate line, respectively, are created between the sub-pixel electrode and the common electrode, and the angle between the direction of the liquid crystal electric field in the first domain and the direction of the liquid crystal electric field in the second domain is larger than 0° and smaller than 180°.

According to another embodiment of the disclosure, there is provided a liquid crystal display comprising the above sub-pixel structure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Hereinafter, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

In an embodiment of the disclosure, a sub-pixel structure of a thin film transistor liquid crystal display (TFT-LCD) is a two-domain sub-pixel structure capable of forming liquid crystal electric fields in two domains, wherein a gate line is located at the interface between the liquid crystal electric fields in the two domains. That is, a liquid crystal electric field in a first domain and a liquid crystal electric field in a second domain, which are created between a sub-pixel electrode and a common electrode, are located on both sides of the gate line, respectively. Herein, the angle between the direction of the liquid crystal electric field in the first domain and the direction of the liquid crystal electric field in the second domain is larger than 0° and smaller than 180°.

In an existing two-domain sub-pixel structure, at the interface between liquid crystal electric fields in two domains, a dark region is likely to occur on a display panel. Moreover, another dark region corresponding to the gate line also occur on a display panel of a TFT-LCD, since a black matrix corresponding to the gate line is provided on the color filter of the TFT-LCD. In embodiments of this application, the above two dark regions are overlapped by disposing a gate line at the interface between the two domains, thus resulting in a reduced area of the dark region in the display area of a TFT-LCD display panel, an enhanced transmittance of the two-domain sub-pixel structure, and an improved image quality.

The following description is mainly related to a single sub-pixel structure, but other sub-pixel structures can be formed in the same way.

Figure 1:
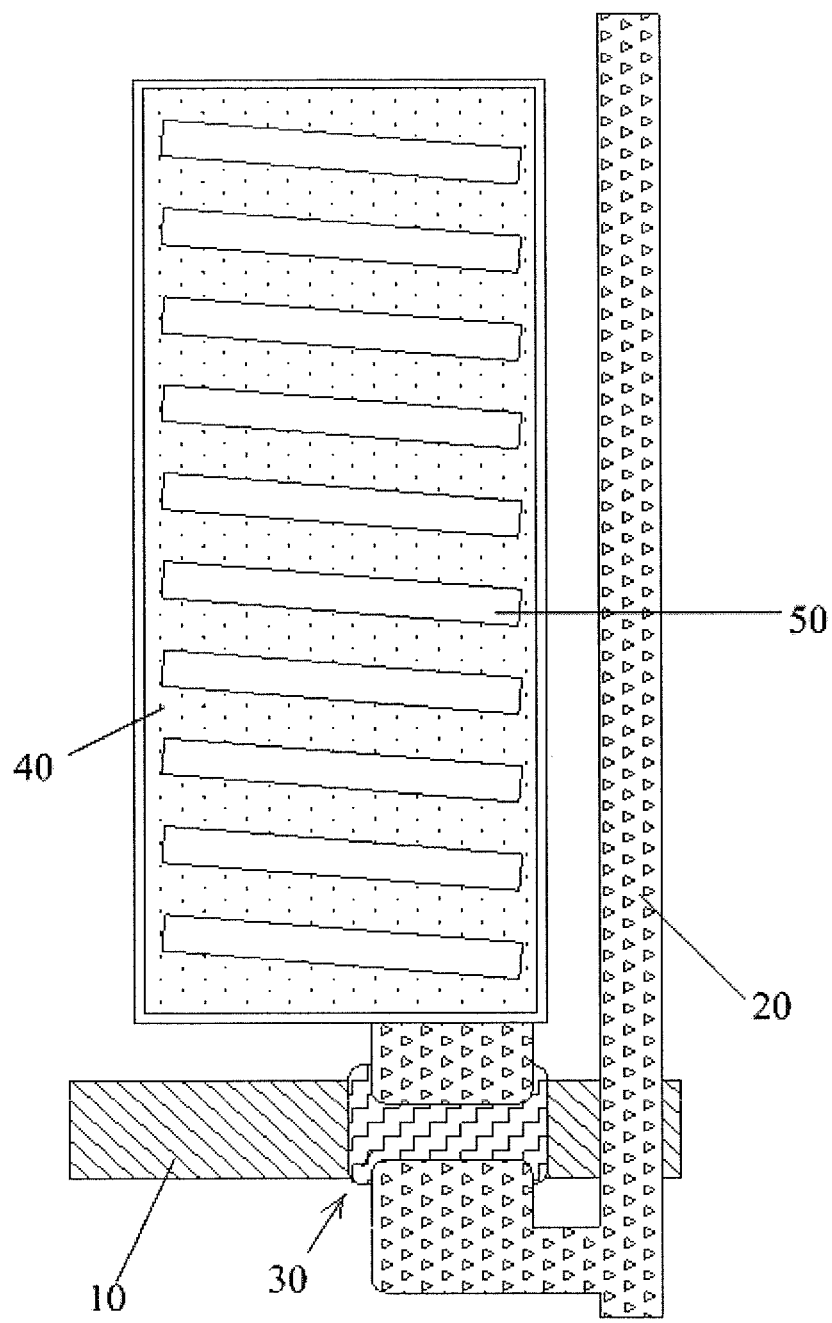
FIG. 1 is a schematic top view illustrating the configuration of an one-Domain sub-pixel structure on an array substrate in prior art.
Figure 2:
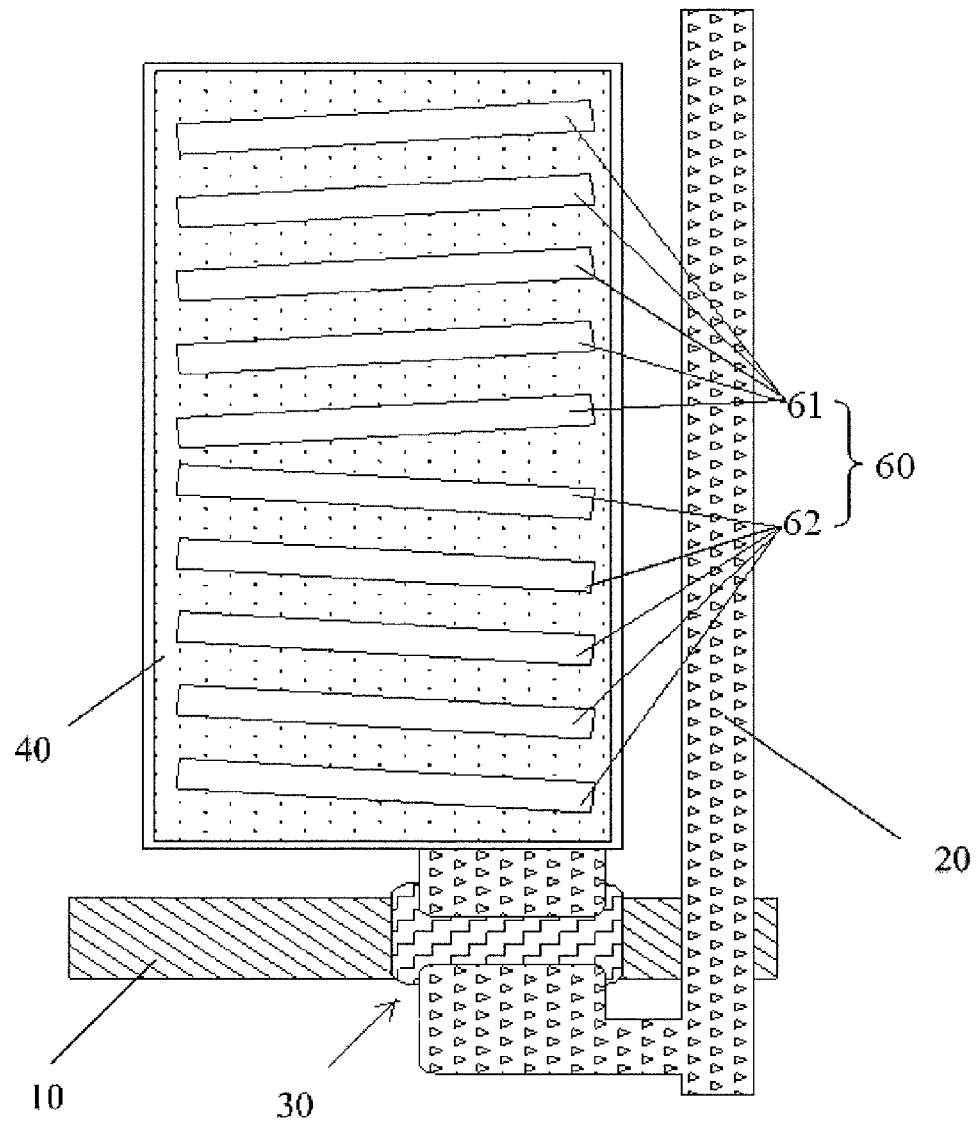
FIG. 2 is a schematic top view illustrating the configuration of a two-domain sub-pixel structure on an array substrate in prior art.
Figure 3:
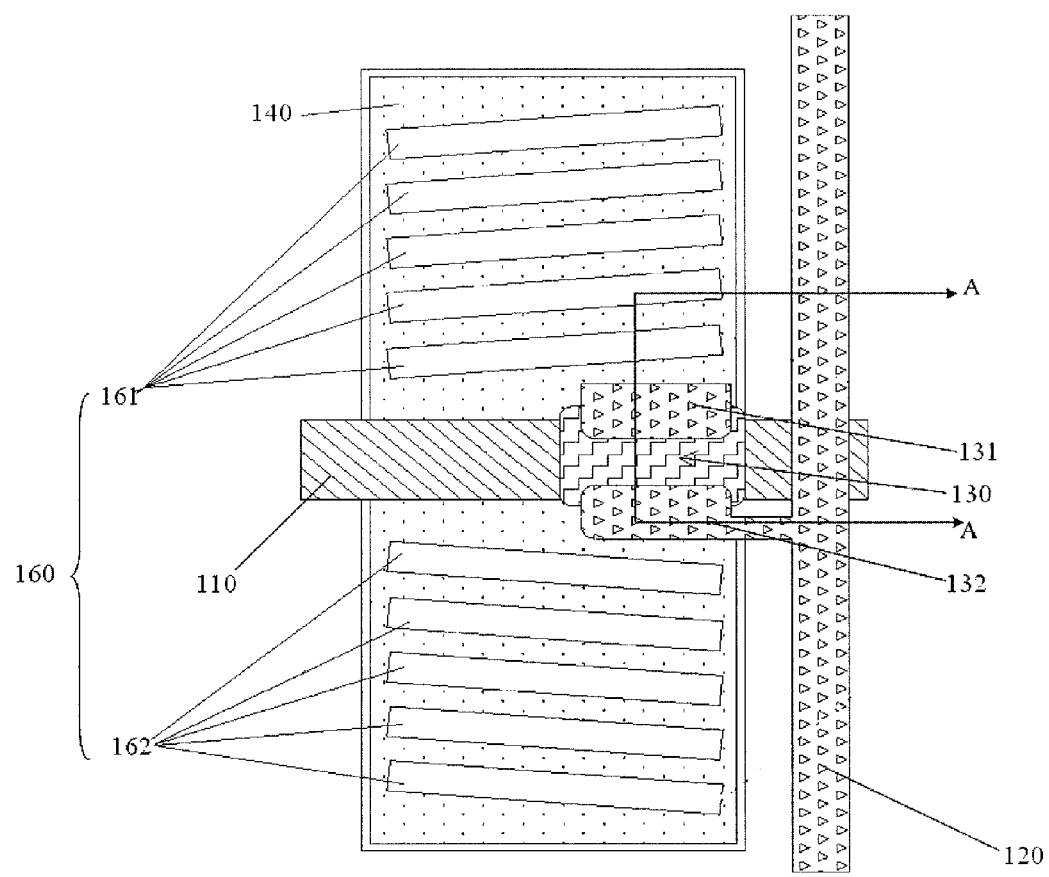
FIG. 3 is a schematic top view illustrating the configuration of a sub-pixel structure on an array substrate according to an embodiment of the disclosure.

Referring to FIG. 3, in an embodiment of the disclosure, the configuration of a sub-pixel structure of a TFT-LCD on an array substrate comprises: a gate line 110 and a data line 120 perpendicular to each other, a thin film transistor 130 located in an intersection region of the gate line 110 and the data line 120, and a sub-pixel electrode 140 and a common electrode 160 which are located in the region surrounded by the gate line 110 and the data line 120. Herein, the sub-pixel electrode 140 and the common electrode 160 are overlapped with each other, and they are electrically isolated by a passivation layer therebetween (not shown in FIG. 3). The common electrode 160 contains two kinds of strip-like common electrodes 161 and 162 which are different in orientation, and the sub-pixel electrode 140 is for example a plate-like electrode. The common electrode 160 is formed over the pixel electrode 140.

A liquid crystal electric field in a first domain is created between the sub-pixel electrode 140 and the strip-like common electrodes 161; a liquid crystal electric field in a second domain is created between the sub-pixel electrode 140 and the strip-like common electrodes 162. The liquid crystal electric field in the first domain and the liquid crystal electric field in the second domain are located on both sides of the gate line 10, respectively.

Specifically, the common electrode 160 includes the strip-like common electrodes 161 in the first domain and the strip-like common electrodes 162 in the second domain, which are located on both sides of the gate line 110 respectively. The strip-like common electrodes 161 in the first domain are used for creating the liquid crystal electric field in the first domain; and the strip-like common electrodes 162 in the second domain are used for creating the liquid crystal electric field in the second domain.

As can be seen, the strip-like common electrodes 161 in the first domain and the strip-like common electrodes 162 in the first domain, which are used to produce the liquid crystal electric field in different domains, are located on different sides of the gate line 110. That is, the gate line is located at the interface between the strip-like common electrodes 161 in the first domain and the strip-like common electrodes 162 in the second domain.

Herein, the direction of the liquid crystal electric field in the first domain and direction of the liquid crystal electric field in the second domain are different. That is, the sub-pixel structure of the TFT-LCD is a two-domain structure. Therefore, the angle between the direction of the liquid crystal electric field in the first domain and the direction of the liquid crystal electric field in the second domain is larger than 0° and smaller than 180°. Here, the directions of the liquid crystal electric fields are determined by the strip-like common electrodes 161 and 162. The angle between the direction of the strip-like common electrodes 161 in the first domain and the direction of the strip-like common electrodes 162 in the second domain is larger than 0° and smaller than 180°.

Figure 6:
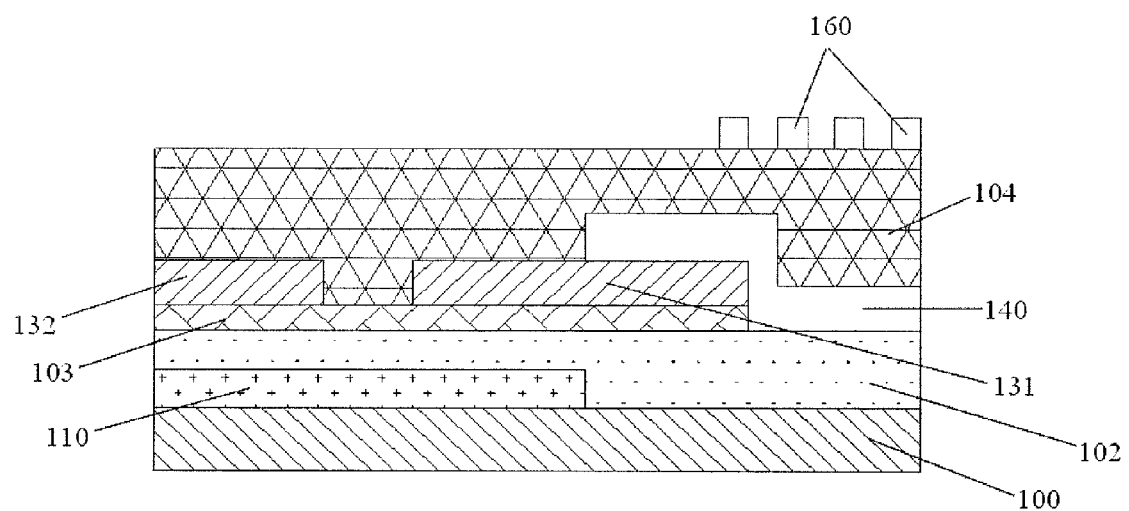
FIG. 6 is a schematic view illustrating a cross section of the configuration of the sub-pixel structure on the array substrate which is taken along line A-A in FIG. 3.

In the above sub-pixel structure, referring to FIGS. 3 and 6, the thin film transistor 130 is located above the gate line 110, wherein the gate electrode of the thin film transistor 130 is connected to the gate line 110, the drain electrode 132 of the thin film transistor 130 is connected to the data line 120, and the source electrode 131 of the thin film transistor 130 is connected to the sub-pixel electrode 140. The sub-pixel electrode 140 and the common electrodes 160 are located in the region surrounded by the gate line 110 and the data line 120. The liquid crystal electric field in the first domain and the liquid crystal electric field in the second domain are both located on the same side of the data line 120.

The above two-domain sub-pixel structure further comprises a black matrix on the color filter substrate, corresponding to the gate line 110.

In the sub-pixel structure according to the embodiment of the disclosure, the gate line 110 is located at the interface between the liquid crystal electric fields in the two domains. That is, the liquid crystal electric fields created in different domains are located on different sides of the gate line 110 respectively. In the sub-pixel structure of the TFT-LCD shown in FIG. 3, the thin film transistor 130 is located above the gate line 110, and the source electrode 131 and the drain electrode 132 of the thin film transistor 130 are located on both sides of the central line of the gate line 110 respectively and above the central line. As can be seen, the source electrode 131 of the thin film transistor 130 is connected to the sub-pixel electrode 140 merely on one side of the gate line 110. Thus, during the manufacture of the TFT-LCD, the gate-source parasitic capacitance Cgs is probably changed in the case that a process deviation occurs when a gate layer and a source-drain (SD) layer are produced, causing different leaping voltages in different display areas. When the leaping voltage is large, image flickers or image sticking occurs, thus deteriorating the image quality.

Thus, in order to further improve the image quality of the TFT-LCD, in another embodiment of the disclosure, the structure of the thin film transistor is changed, so that two ends of the source electrode of the thin film transistor are both connected to a sub-pixel electrode. For example, referring to FIG. 4, a sub-pixel structure of a TFT-LCD on an array substrate, comprises a gate line 110, a data line 120, a thin film transistor 130', a sub-pixel electrode 140 and a common electrode 160.

Figure 4:
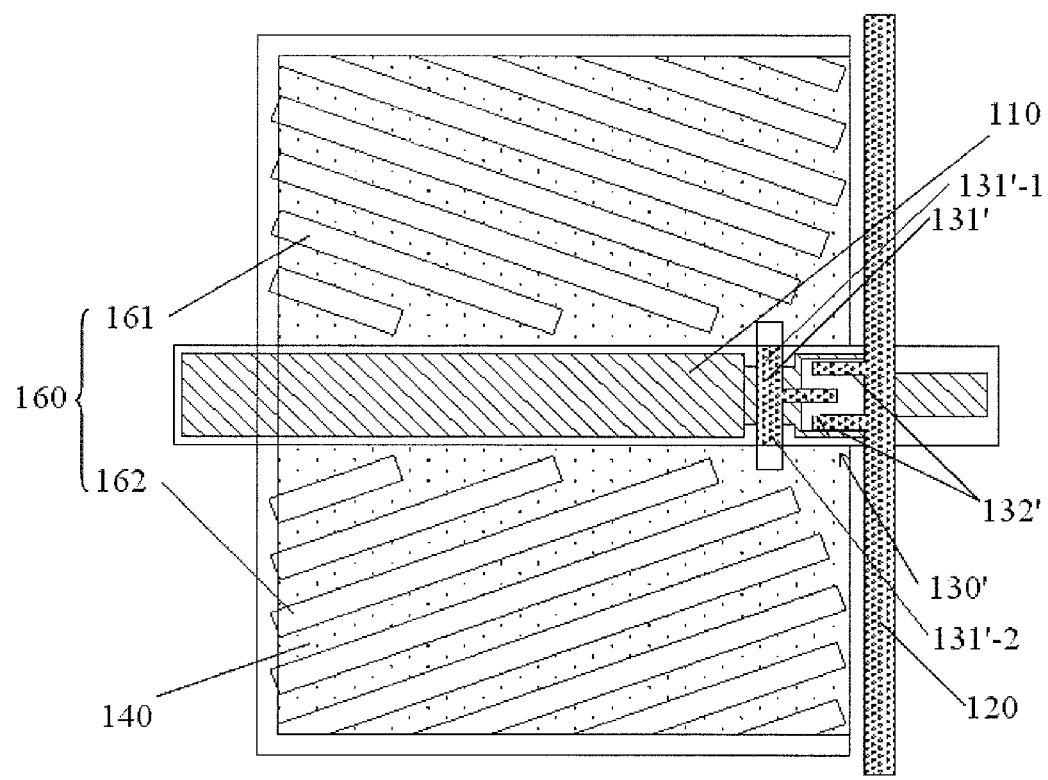
FIG. 4 is a schematic top view illustrating the configuration of a sub-pixel structure on an array substrate according to another embodiment of the disclosure.

The difference between the sub-pixel structure of the TFT-LCD shown in FIG. 4 and the sub-pixel structure of the TFT-LCD shown in FIG. 3 lies in the thin film transistor 130'. The thin film transistor 130' is located above the gate line 110, wherein the source electrode 131' of the thin film transistor 130' has two ends 131'-1 and 131'-2 which are located on both sides of the central line of the gate line 110, respectively, and the two ends 131'-1 and 131'-2 are each connected to the sub-pixel electrode 140.

In such a manner, the gate-source parasitic capacitance Cgs has a function of self compensation. When the pixel structure 140 is manufactured, even if a process deviation occurs during forming a gate layer and a SD layer, the overall Cgs is always not changed no matter which direction the deviation takes place in. The reason is that, Cgs here is divided into two parts on both sides of the central line of the gate line 110, and accordingly, no matter how the processes change, the overall Cgs is always not changed. Thereby, the leaping voltage ΔVp is stabilized, image flicker or image sticking is less likely to occur, thus the image quality is guaranteed.

In the thin film transistor 130' shown in FIG. 4, the source electrode 131' is formed to be perpendicular to the gate line 110, and is symmetric with respect to the central line of the gate line 110. Thus, self compensation of Cg is further ensured.

Since the source electrode 131' of the thin film transistor 130' shown in FIG. 4 is perpendicular to the gate line 110, the structure of the drain electrode 132' of the thin film transistor 130' may also be changed. As shown in FIG. 4, the drain electrode 132' is also located on both sides of the central line of the gate line 110, and preferably, the drain electrode 132' is also symmetric with respect to the central line of the gate line 110.

It should be understood that the structure of the thin film transistor 130' shown in FIG. 4 is merely a specific structure of the thin film transistor 130' according to an embodiment of the disclosure. In other embodiments, as long as two ends of a source electrode of a thin film transistor are connected to a sub-pixel electrode, the gate-source parasitic capacitance Cgs in the thin film transistor has the function of self-compensation. For example, the source electrode of a thin film transistor is located above a gate line, there is an angle of 60° between the source electrode and the gate line, and two ends of the source electrode are each connected to a sub-pixel electrode. In this case, the gate-source parasitic capacitance Cgs in this thin film transistor can have the function of self-compensation. Thin film transistors with other similar structures are not given here.

The embodiments of the disclosure will be further described in detail below in combination with accompanied drawings of the specification.

The sub-pixel structure of the TFT-LCD in the embodiment is a two-domain structure. The direction of the liquid crystal electric field in the first domain is different from the direction of the liquid crystal electric field in the second domain. A mask process comprises processes of pattern designing, photoresist coating, exposure, development, etching, etc.

Figure 5:
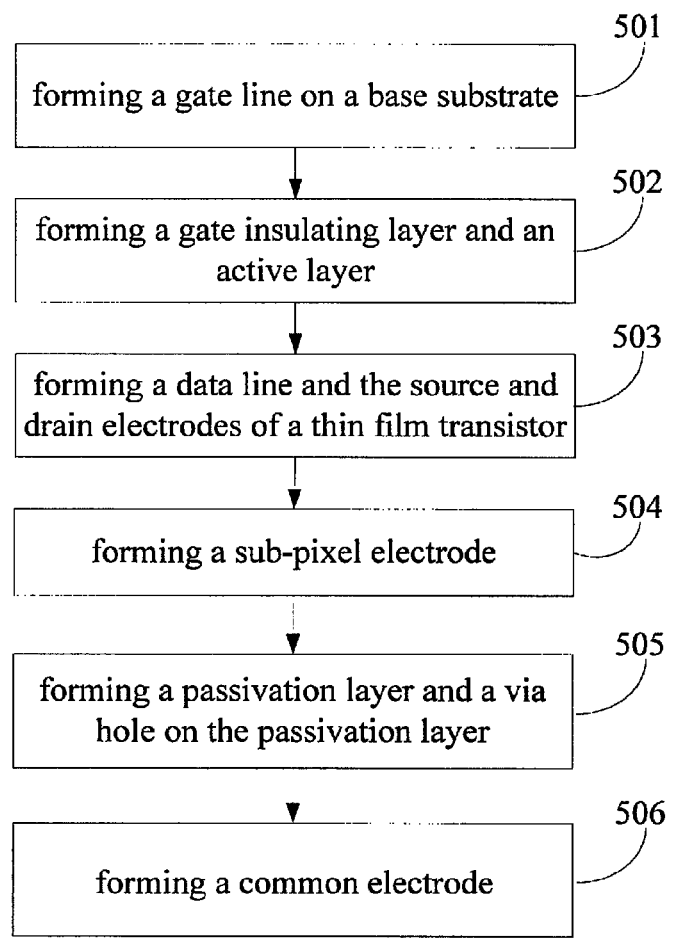
FIG. 5 is a flow chart illustrating the manufacture process of a configuration of a pixel structure on the array substrate in an embodiment of the disclosure.

Referring to FIGS. 3, 5 and 6, a manufacturing process of the sub-pixel structure of the TFT-LCD comprises:

Step 501: a gate line 110 is formed on a base substrate 100.

Here, the gate line 110 is formed on the substrate 100 by using a mask process. Different from an existing two-domain sub-pixel structure, the gate line 110 in the embodiment is designed to be formed at the interface between strip-like common electrodes to be formed in two domains. That is, the strip-like common electrodes 161 to be formed for creating the liquid crystal electric field in the first domain and the strip-like common electrodes 162 to be formed for creating the liquid crystal electric field in the second domain will locate on both sides of the gate line 110, respectively. Thus, during the process of pattern designing for a mask plate, only the position of the pattern for forming the gate line needs to be changed, so that the gate line to be formed will locate at the interface between the strip-like common electrodes 161 in the first domain and the strip-like common electrodes 162 in the second domain. Then, by using the mask plate with pattern thus designed, subsequent processes of photoresist coating, exposure, development, etching and so on are conducted, so as to form the gate line 110 in the embodiment.

Step 502: a gate insulating layer 102 and an active layer 103 are successively formed. The active layer 103 is for example a multilayered film including a-Si and $n^+$-Si.

Step 503: the data line 120 and the source electrode 131 and the drain electrode 132 of a thin film transistor 130 are formed. The source electrode 131 and the drain electrode 132 of the thin film transistor 130 are located on the active layer 103.

Here, a mask process is still used. Since the thin film transistor is located above the gate line and the data line is connected to the drain electrode, during the formation of the pixel structure shown in FIG. 3, it is still only required to design the position of patterns for forming the data line, the source and drain electrodes of the thin film transistor, and a TFT channel in accordance with the position of the formed gate line 110 during a process of pattern designing of a mask plate. Then, by using the mask plate with patterns thus designed, subsequent processes of photoresist coating, exposure, development, etching and so on are conducted.

If the pixel structure shown in FIG. 4 is to be formed, then it is necessary to connect each of the two ends of the source electrode of the thin film transistor to a sub-pixel electrode. Preferably, the source electrode is formed to be perpendicular to the gate line and is symmetric with respect to the central line of the gate line. Of course, the drain electrode is still connected to the data line. Preferably, the drain electrode is also formed to be symmetric with respect to the central line of the gate line.

Step 504: a transparent conductive thin film is deposited and patterned to form the sub-pixel electrode 140 by using a mask process.

The sub-pixel electrode 140 is connected to the drain electrode 132.

Here, a single-layered film of Indium Tin Oxide (ITO) or Indium Zinc Oxide (IZO) or a multilayered film of the above materials may be used for the transparent conductive thin film. Material of the transparent conductive thin film contains Indium Tin Oxide (ITO), Indium Zinc Oxide (IZO), or both of them.

Step 505: a passivation layer 104 and a via hole therein are formed.

Here, although there is no via hole in the sub-pixel structure, the via hole is formed in a periphery region of the display panel. Therefore, after deposition of the passivation layer, it is still necessary to conduct a mask process.

Step 506: a transparent conductive thin film is deposited and patterned to form a common (Vcom) electrode 160 by using a mask process.

The transparent conductive film deposited in this step may be identical with that in step 504.

Thus, the passivation layer 104 is contained between the common electrodes 150 and the sub-pixel electrode 140.

The sub-pixel structure of the TFT-LCD can be manufactured according to the above 1+4 mask processes. However, embodiments of the disclosure are not limited thereto. 1+5 mask processes may also be adopted to manufacture the sub-pixel structure of the TFT-LCD. Since only the position of the gate line is changed, or the position of the gate line and the structure of the thin film transistor are changed, it is only required to modify the pattern design of mask plates in the mask processes, and all other steps do not need to be changed. Therefore, all processes for forming a sub-pixel structure of TFT-LCD in prior art can be used to fabricate the sub-pixel structure of the TFT-LCD in the embodiment of the disclosure.

In the sub-pixel structure of the TFT-LCD of all the embodiments above, the direction of the liquid crystal electric field in each of the domains is determined by the common electrodes. However, embodiments of the disclosure are not limited thereto.

In another embodiment of the disclosure, the direction of liquid crystal electric field in each of the domains may also be determined by a sub-pixel electrode. In this case, the sub-pixel electrode is divided into two domains, located on both sides of a gate line respectively. That is, a sub-pixel electrode in a first domain for creating a liquid crystal electric field in the first domain and a sub-pixel electrode in a second domain for creating a liquid crystal electric field in the second domain are located on both sides of the gate line, respectively. The direction of the liquid crystal electric field in the first domain is different from the direction of the liquid crystal electric field in the second domain. That is, the angle between the sub-pixel electrodes in the first domain and the sub-pixel electrodes in the second domain is larger than 0° and smaller than 180°. In this embodiment, the common electrode is an ITO electrode layer which is not divided into domains. In the embodiment, the sub-pixel electrodes divided into two domains still need to be connected to the source electrode of a TFT. The sub-pixel electrode divided into two domains may be connected to only one end of the source electrode. Preferably, in order to assure the self compensation of the Cg, the sub-pixel electrode divided into two domains may be connected to two ends of the source electrode, that is, the sub-pixel electrode in the first domain is connected to one end of the source electrode, and the sub-pixel electrode in the second domain is connected to the other end of the source electrode. Other structures in the sub-pixel structure of the TFT-LCD can be the same as those in the embodiments described above with reference to FIGS. 3, 4 and 6, thus omitting the detail description thereof.

In the sub-pixel structure of the TFT-LCD according to any one of the embodiments described above, the TFT are located above the gate line, and thus the source electrode and the drain electrode of the TFT are both located above the gate line. However, embodiments of the disclosure are not limited thereto. In pixel structures of TFT-LCDs according to other embodiments of the disclosure, the source electrode and the drain electrode of the TFT may be located under or beside a gate line. That is, in a pixel structure of a TFT-LCD according to embodiments of the disclosure, the position relationships between the gate line, the data line and the thin film transistor may be diverse, as long as the liquid crystal electric field in the first domain and the liquid crystal electric field in the second domain which are created between a sub-pixel electrode and a common electrode, are located on both sides of the gate line, respectively.

In the embodiments of the disclosure, the gate line in the sub-pixel structure of the TFT-LCD is located at the interface between the liquid crystal electric fields in two domains. That is, on one side of the gate line, there is the liquid crystal electric field in the first domain, and on the other side of the gate line, there is the liquid crystal electric field in the second domain. The direction of the liquid crystal electric field in the first domain is different from the direction of the liquid crystal electric field in the second domain. And, a black matrix used for light shielding is present at the interface of the two domains. Thus, on the display panel of the TFT-LCD, the dark region formed at the interface between the liquid crystal electric fields in two domains overlaps with the dark region formed by the gate line, resulting in a reduced area of the dark region on the display panel, an enhanced transmittance of the two-domain structure, and an improved image quality.

Further, since the thin film transistor is changed such that two ends of the source electrode of the thin film transistor are connected to the sub-pixel electrode, the gate-source parasitic capacitance Cgs can be self-compensated. Even if a process deviation occurs during the formation of the pixel structure, value of Cgs will not be changed. Thus, leaping voltage $\Delta Vp$ is stabilized, image flicker or image sticking is less likely to occur, and the image quality is guaranteed.

It should be understood that, herein, "a first member is located on one side of a third member" means that the vertical projection of the first member on a base substrate is located on one side of the vertical projection of the third member on the base substrate. Likewise, "a first member and a second member are located on both sides of a third member, respectively" means that the vertical projections of the first member and the second member on a base substrate are located on both sides of the vertical projection of the third member on the base substrate, respectively. "A first member is located over a second member" herein means that the first member is farther from a base substrate than the second member.

An embodiment of the disclosure further provides a liquid crystal comprising the sub-pixel structure of any of the forgoing embodiments. For example, the liquid crystal display in the embodiment of the disclosure is used in liquid crystal televisions, cell phones, liquid crystal display devices, GPSs, etc. In some examples, the liquid crystal display further includes a backlight source for providing the array substrate with backlight.

(1) A sub-pixel structure of a thin film transistor liquid crystal display, comprising: a gate line, a data line, a thin film transistor, a sub-pixel electrode, and a common electrode, which are formed on an array substrate, wherein, a liquid crystal electric field in a first domain and a liquid crystal electric field in a second domain, which are located on both sides of the gate line respectively, are created between the sub-pixel electrode and the common electrode, and the angle between the direction of the liquid crystal electric field in the first domain and the direction of the liquid crystal electric field in the second domain is larger than 0° and smaller than 180°.

(2) The sub-pixel structure according to (1), wherein the common electrode includes a common electrode in the first domain and a common electrode in the second domain which are located on both sides of the gate line respectively, the liquid crystal electric field in the first domain is created between the common electrode in the first domain and the sub-pixel electrode, and the liquid crystal electric field in the second domain is created between the common electrode in the second domain and the sub-pixel electrode.

(3) The sub-pixel structure according to (1), wherein the sub-pixel electrode includes a sub-pixel electrode in the first domain and a sub-pixel electrode in the second domain which are located on both sides of the gate line respectively, the liquid crystal electric field in the first domain is created between the sub-pixel electrode in the first domain and the common electrode, and the liquid crystal electric field in the second domain is created between the sub-pixel electrode in the second domain and the common electrode.

(4) The sub-pixel structure according to (1), wherein two ends of a source electrode of the thin film transistor are each connected to the sub-pixel electrode.

(5) The sub-pixel structure according to (4), wherein the source electrode of the thin film transistor is perpendicular to the gate line, and is symmetric with respect to the central line of the gate line.

(6) The sub-pixel structure according to (4) or (5), wherein the drain electrode of the thin film transistor is connected to the data line, and is symmetric with respect to the central line of the gate line.

(7) The sub-pixel structure according to (1), wherein the liquid crystal electric field in the first domain and the liquid crystal electric field in the second domain are both located on the same side of the data line.

(8) The sub-pixel structure according to (1), wherein a passivation layer is included between the sub-pixel electrode and the common electrode.

(9) The sub-pixel structure according to (1), wherein the sub-pixel structure further comprises a black matrix located at a location corresponding to the gate line, on a color filter substrate.

(10) A thin film transistor liquid crystal display comprising the pixel structure in any of (1) to (9).

Although the present invention has been described in detail above with general explanations and specific embodiments, it is obvious to those skilled in the technical field that some modifications or improvements can be made on the basis of the present invention. Thus, all these modifications or improvements made without departing from the spirit of the disclosure come within the protection scope of the disclosure.

What is claimed is:

1. A sub-pixel structure of a thin film transistor liquid crystal display, comprising: a gate line, a data line, a thin film transistor, a sub-pixel electrode, and a common electrode, which are formed on an array substrate, wherein,
   a liquid crystal electric field in a first domain and a liquid crystal electric field in a second domain, which are located on both sides of the gate line, respectively, are created between the sub-pixel electrode and the common electrode, and the angle between the direction of the liquid crystal electric field in the first domain and the direction of the liquid crystal electric field in the second domain is larger than 0° and smaller than 180°, and wherein,
   two ends of the source electrode of the thin film transistor are each connected to the sub-pixel electrode, and wherein,
   the drain electrode of the thin film transistor is symmetric with respect to the central line of the gate line and comprises two parts which are located on both sides of the central line of the gate line and which are separated from each other, and the two parts are connected to the data line respectively, and wherein
   the source electrode is T shaped and has a protrusion interposed between the two parts of the drain electrode,
   the structure further comprises a black matrix located at a location corresponding to the gate line, on a color filter substrate, and both the black matrix and the gate line are present at the interface between the first domain and the second domain.

2. The sub-pixel structure claimed as claim 1, wherein the common electrode includes a common electrode in the first domain and a common electrode in the second domain which are located on both sides of the gate line respectively, the liquid crystal electric field in the first domain is created between the common electrode in the first domain and the sub-pixel electrode, and the liquid crystal electric field in the second domain is created between the common electrode in the second domain and the sub-pixel electrode.

3. The sub-pixel structure claimed as claim 1, wherein the sub-pixel electrode includes a sub-pixel electrode in the first domain and a sub-pixel electrode in the second domain which are located on both sides of the gate line respectively, the liquid crystal electric field in the first domain is created between the sub-pixel electrode in the first domain and the common electrode, and the liquid crystal electric field in the second domain is created between the sub-pixel electrode in the second domain and the common electrode.

4. The sub-pixel structure claimed as claim 1, wherein both the liquid crystal electric field in the first domain and the liquid crystal electric field in the second domain are located on the same side of the data line.

5. The sub-pixel structure claimed as claim 1, wherein a passivation layer is included between the sub-pixel electrode and the common electrode.

6. A thin film transistor liquid crystal display comprising the pixel structure claimed as claim 1.

* * * * *